UNITED STATES PATENT OFFICE.

KARL VON STECHOW, OF WIESBADEN, GERMANY.

METHOD OF EXTRACTION OF PURE RAW RUBBER FROM RUBBER-PLANTS.

No. 814,407. Specification of Letters Patent. Patented March 6, 1906.

Application filed July 8, 1905. Serial No. 268,869.

*To all whom it may concern:*

Be it known that I, KARL VON STECHOW, a subject of the German Emperor, and a resident of Wiesbaden, Germany, have invented a certain new and useful Method of Extraction of Pure Raw Rubber from Rubber-Plants, of which the following is a specification.

This invention relates to a method of extraction of pure raw rubber from rubber-plants.

The plants after being chopped up are treated mechanically by machines working in water—such as washing, rolling, and kneading apparatus or wet-ball mills. The raw material extracted in this manner after it has been pressed or rolled into thin pieces is placed in an extractor. In the extractor the previously-worked material is treated with mixtures of acetone, amyl and methyl oxyhydrate, and alcohol under the action of heat until the pure rubber remains as a residue. By the extraction the result is obtained that the resin, oil, wax, and the like adhering to the rubber is completely separated from the raw material, by which means first-class rubber is obtained. The raw rubber thus extracted is washed after the extraction and then dried. The resin, oil, wax, &c., extracted is then separated from the acetone, amyl and methyl oxyhydrate, and the alcohol by distillation of the mixtures.

Having now described my invention, what I claim, and desire to secure by Letters Patent of the United States, is—

The herein-described process of obtaining raw rubber from rubber-plants consisting in crushing the comminuted plants in water and extracting the raw material so obtained with mixtures of acetone, amyl and methyl oxyhydrate and alcohol under the action of heat until the resin, oil, wax and the like adhering to the rubber is completely separated and the pure rubber obtained.

In testimony whereof I have signed my name to this specification in the presence of two subscribing witnesses.

KARL VON STECHOW.

Witnesses:
 ERNST MOLKENTIN,
 LOUIS GALLÉ.